United States Patent
Kory et al.

[11] Patent Number: 6,053,125
[45] Date of Patent: Apr. 25, 2000

[54] CAT LITTER AND PROCESS OF MAKING

[75] Inventors: Daniel R. Kory, Holland; Glenn E. Hall, Maumee, both of Ohio

[73] Assignee: The Andersons, Inc., Maumee, Ohio

[21] Appl. No.: 09/085,771

[22] Filed: May 28, 1998

Related U.S. Application Data

[60] Provisional application No. 60/048,518, Jun. 4, 1997.

[51] Int. Cl.[7] ..................................................... A01K 1/01
[52] U.S. Cl. ............................................................. 119/171
[58] Field of Search ..................................... 119/171, 172, 119/173

[56] References Cited

U.S. PATENT DOCUMENTS

| | | |
|---|---|---|
| 3,059,615 | 10/1962 | Kuceski et al. . |
| 3,789,797 | 2/1974 | Brewer .................... 119/173 |
| 3,921,581 | 11/1975 | Brewer . |
| 3,941,090 | 3/1976 | Fry . |
| 4,157,696 | 6/1979 | Carlberg . |
| 4,206,718 | 6/1980 | Brewer .................... 119/171 |
| 4,296,709 | 10/1981 | Schulein, Jr. . |
| 4,471,717 | 9/1984 | Lander . |
| 4,537,148 | 8/1985 | Lowe, Jr. . |
| 4,541,359 | 9/1985 | Hickey et al. . |
| 4,676,196 | 6/1987 | Lojek et al. . |
| 4,712,508 | 12/1987 | Lowe . |
| 4,821,677 | 4/1989 | Harrison . |
| 5,000,115 | 3/1991 | Hughes .................... 119/173 |
| 5,041,410 | 8/1991 | Ivie ........................ 119/171 |
| 5,062,954 | 11/1991 | Leedy et al. . |
| 5,152,250 | 10/1992 | Loeb ....................... 119/171 |
| 5,183,010 | 2/1993 | Raymond et al. ......... 119/172 |
| 5,193,489 | 3/1993 | Hardin ..................... 119/173 |
| 5,195,465 | 3/1993 | Webb et al. .............. 119/172 |
| 5,207,389 | 5/1993 | Hall et al. ................. 241/3 |
| 5,216,980 | 6/1993 | Kiebke ..................... 119/173 |
| 5,352,780 | 10/1994 | Webb et al. .............. 536/56 |
| 5,361,719 | 11/1994 | Kiebke ..................... 119/171 |
| 5,429,741 | 7/1995 | Webb et al. .............. 210/242 |
| 5,542,374 | 8/1996 | Palmer, Jr. ............... 119/173 |
| 5,614,458 | 3/1997 | Webb et al. .............. 502/401 |
| 5,630,377 | 5/1997 | Kumlin .................... 119/172 |

*Primary Examiner*—Jack W. Lavinder
*Assistant Examiner*—Yvonne R. Abbott
*Attorney, Agent, or Firm*—Gifford, Krass, Groh, Sprinkle, Anderson & Citkowski, P.C.

[57] ABSTRACT

A biodegradable, clumpable cat litter made from corncob and biomass components. The animal litter is a mixture of heavy density particles and light density particles. The heavy density particles are formed of corncob grit and the light density particles are formed of sized pellets of light weight corncob components. Heavy density and light density particles are coated with mineral oil to which is adhered guar gum. The heavy density particles compose 30%–70% of the mixture and the remainder is composed of light density particles.

20 Claims, 1 Drawing Sheet

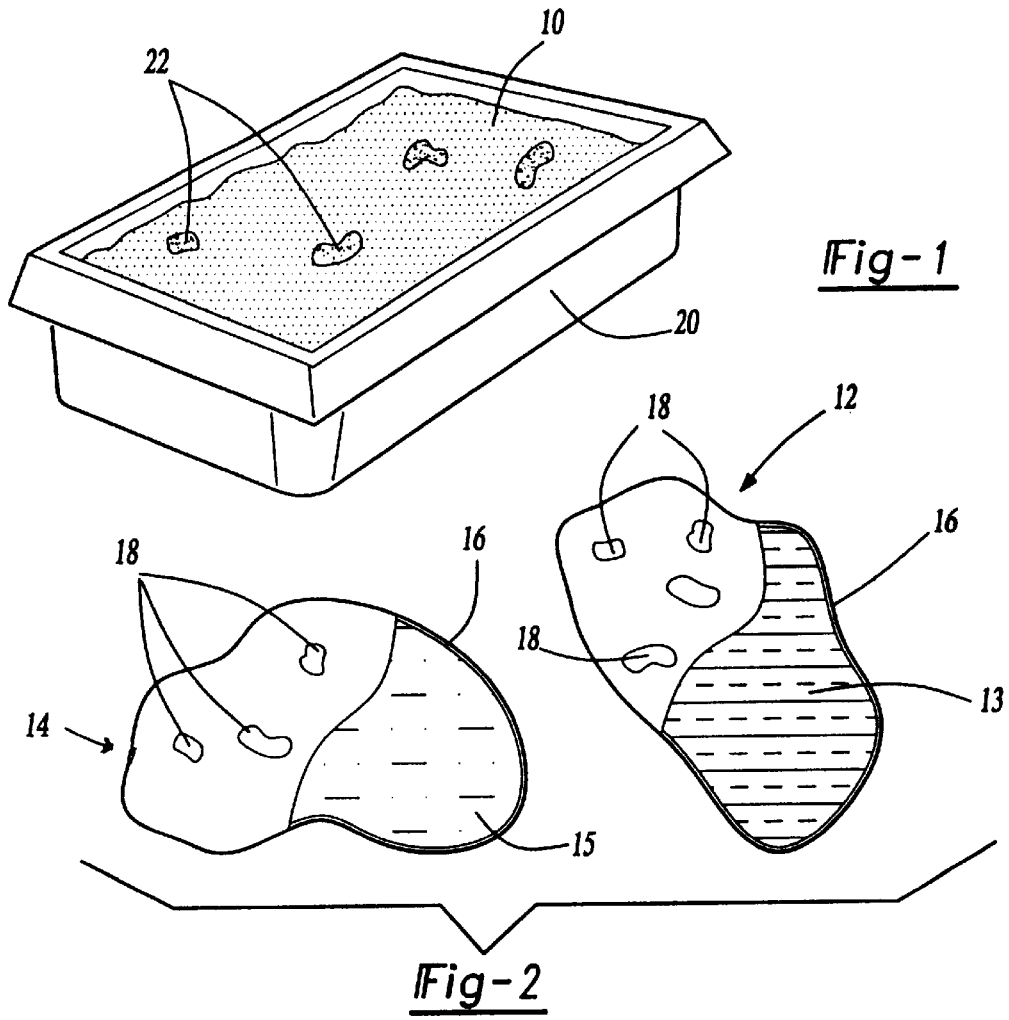
*Fig-1*
*Fig-2*
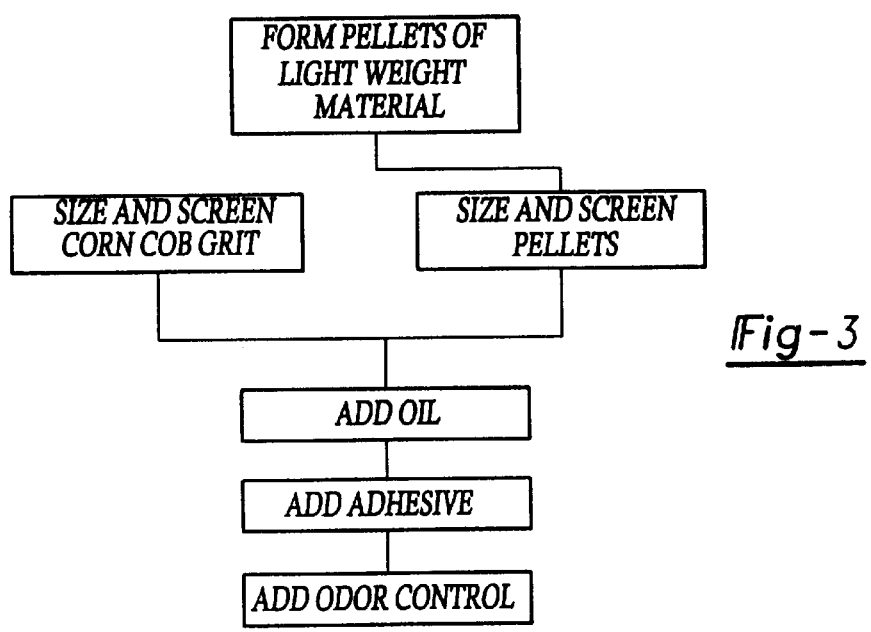
*Fig-3*

CAT LITTER AND PROCESS OF MAKING

This application claims the benefit of U.S. Provisional Application Ser. No. 60/048,518, filed Jun. 4, 1997.

BACKGROUND OF THE INVENTION

I. Field of the Invention

The invention relates to disposable cat litter and a method of making the same. More particularly, the invention relates to a cat litter formed primarily of corncob grit and sized pellets of corncob chaff and pith and a method for producing the same.

II. Description of the Prior Art

Corncob grit has been used as animal litter for some time. Grit is the woody pulp portion of the cob, the remainder of the cob being pith and chaff. Corncob grit is used as litter because it is compostable, biodegradable, and has superior odor control properties. However, only 60% of the cob is grit, so the remaining 40% of the cob is waste. Additionally, the sorption rate of grit is not fast enough to absorb all of the urine before it reaches the bottom of the tray. When urine reaches the bottom of the tray, it collects and bonds litter to the tray as it dries. Accordingly, it would be desirable to produce a litter which has superior odor control and sorption rate.

Clumpable animal litter formed of particles of bentonite clay, as disclosed in U.S. Pat. No. 5,000,115, has also been used for some time. The particles of the bentonite clay adhere together and form a clump when moistened by animal dross. The clump of the moistened litter may then be easily removed from the litter box with a scoop and discarded, thereby extending the useful life of a batch of litter. However, bentonite clay used in clumpable cat litter contains mica. Mica is carcinogenic, accordingly, use of such a compound raises health concerns for both the animal concerned and the person changing the litter.

Known animal litters are easily "tracked" by the animals. Tracking occurs when litter adheres to the paws or feet of the animal and is carried outside the litter box when the animal leaves. The litter then gradually leaves the paws or feet of the animal, leaving a "track" of litter particles. Accordingly, it would be advantageous to produce a clumpable, biodegradable animal litter which was safe to use, easily disposed of, and has minimal tracking.

Accordingly, it is an object of the invention to produce an economical animal litter from fully natural biodegradable products which is completely compostable and has a low degree of tracking.

SUMMARY OF THE INVENTION

Accordingly, an animal litter formed of a mixture of heavy density and light density particles has been developed. Both the heavy density and light density particles are formed of natural materials which are biodegradable and compostable. In the preferred embodiment, the heavy density particles are formed of corncob grit and the light density particles are formed of pelletized corncob chaff and pith or other natural materials. The litter is composed of 30% to 70% by weight of the heavy density particles which have a density of about 30 lb/cu ft. The remainder of the litter is light density particles having a density of about 23 lb/cu ft. In the preferred embodiment, the light density particles are formed from pellets of corncob chaff and pith. Both types of particles are reduced to a predetermined size distribution by roller milling and hammer milling techniques.

The method includes reducing to size and screening the heavy density material, forming the pellets of light density material having a predetermined density, reducing to size and screening the sized pellets and forming a homogenous mixture. Additionally, mineral oil and guar gum may be added to coat the particles to reduce dust and improve the integrity of the clump. The animal litter according to the invention has excellent odor control, light weight for given volume, better sorption properties than clay materials, and excellent clumping characteristics. The material is essentially dust free, totally free of carcinogens, and has an aesthetically appealing color.

BRIEF DESCRIPTION OF THE DRAWING

A better understanding of the present invention will now be had upon reference to the following detailed description, when read in conjunction with the accompanying drawing, wherein like reference characters refer to like parts throughout the several views, and in which:

FIG. 1 is a perspective drawing of animal litter in a tray in accordance with the invention;

FIG. 2 is a partial cross-sectional view of particles of the animal litter in accordance with the invention; and FIG. 3 is a flow chart showing the steps of the method in accordance with the invention.

DETAILED DESCRIPTION OF THE PREFERRED EMBODIMENTS

As shown in FIG. 1, clumpable animal litter 10 in accordance with the invention is shown in a litter box 20. The animal litter is a mixture of heavy density particles 12 and light density particles 14. Both types of particles 12, 14 are formed of organic materials. In the preferred embodiment, the heavy density particles 12 are formed of corncob grit 13, i.e., the woody ring portion of a corncob, and the light density particles 14 are formed of sized pellets 15 of the light portions of the corncob. The light portions of the corncob are coarse chaff, fine chaff, and pith which constitute approximately 40% of the corncob by weight.

The heavy density particles 12 are formed by reducing corncob grit to size by using conventional hammer milling and roller milling techniques. The heavy density particles have a density of about 30±3 lb/cu ft. The grit particles are screened to be generally 10–30 mesh with about 90% of the particles sized 10–20 mesh (U.S. Standard). A preferred distribution is set forth below.

| GRIT PARTICLES OR HEAVY DENSITY PARTICLES | | | | | |
| --- | --- | --- | --- | --- | --- |
| Screen Size | +10 | 10–14 | 14–20 | 20–30 | 30–40 | –40 |
| % by weight | <1 | 39 | 50 | 10 | 1 | <1 |

The size of the particles affects both the tracking and clumping characteristics of the animal litter. Heavier density and/or larger sized particles are less likely to adhere to the animal and be tracked.

The light density particles 14 are formed from pellets of beeswing or other natural materials. In the preferred embodiment, the pellets of chaff and pith are formed in accordance with the process described in U.S. Pat. No. 5,207,389 in such a manner as to form pellets having a density of approximately 28 to 35 lb/cu ft. The pellets are reduced to an appropriate size by roller milling and hammer milling. After sizing, the light density particles 14 have a density of about 23±3 lb/cu ft. The light density particles 14 are screened to be generally 10–60 mesh (USS). In the preferred embodiment, 78% of the particles are 14–40 mesh (U.S. Standard). A typical size distribution for light density particles 14 is shown in the chart below.

| LIGHT DENSITY PARTICLES | | | | | | | |
|---|---|---|---|---|---|---|---|
| Screen Size | +10 | 10–14 | 14–20 | 20–40 | 40–60 | 60–80 | −80 |
| % by weight | 0 | 10 | 43 | 35 | 10 | 2 | <1 |

The animal litter is then formed of a mixture of heavy density and light density particles 12, 14 so that between 30% to 70% by weight of the mixture is heavy grit particles 12 and the remainder of the mixture is between 70% to 30% by weight, light weight particles 14.

In the preferred embodiment, the mixture is 60% by weight heavy density particles 12 and 40% by weight light density particles 14. This proportion is generally the same as the proportion of heavy weight components or grit to lightweight components or chaff and pith found in a corncob. Thus, in addition to the excellent sorption, odor control, clumping, and tracking properties of the mixture, the mixture is economical because there is little or no waste.

The mixture has a combined density of approximately 28 lb/cu ft±3 lb/cu ft. It has been found that this mixture provides an appropriate balance of densities and sizes to minimize tracking, and maximize animal urine sorption, and clumpability. The particle size distribution set forth above provides excellent clumping and a proper urine sorption rate. If the size of the particles is either too large or too small, the clumping ability is negatively affected. The slightly smaller average size of the light density material facilitates clumping with the larger heavy density material. The clump 22 of litter disintegrates in the water of a toilet and is easily flushed away. If a clump 22 is not to be flushed, it will remain formed as a clump for other manners of disposal.

If the urine absorption rate is too low, urine is absorbed too slowly and some of it flows to the bottom of the litter pan 20, where the litter forms clumps which adhere to the pan 20. These clumps are difficult to remove. When both particles 12, 14 are sized as set forth above, the light density particles have a sufficiently high sorption rate to take up the urine in the top layers of the litter. A clump 22 is then formed in the top layer of the litter which is easily scooped out of the litter box 20 for disposal by flushing down the toilet or other suitable manner.

It has been found that other organic materials such as peanut shells can be substituted for a portion of either the heavy density or light density corncob components to form the light weight particles. The other organic materials include grasses, straw, soy hulls, sunflower hulls, oat hulls, rice hulls, corn stalks, pecan shells, corn husks, spelt hulls, or kenaf. These materials may be added at up to one-third by weight of either the heavy weight or light weight corncob particles. The other materials should be sized and have sorption rates or densities generally the same as the particles which are being replaced. However, these other materials do not have the odor control ability of the corncob components.

As shown in FIG. 2, both the heavy density particles 12 and light density particles 14 are provided with a coating 16 of oil. In the preferred embodiment, the coating 16 is mineral oil and is added as 4% by weight of the total weight of the particles 12, 14. The oil eliminates dust during mixing, handling, packaging, and use. Other oils such as kerosene, mineral seal oil, vegetable oils, or any of a series of paraffinic or naphthinic distillates may also be used.

Although the mixture of sized pellets of light density material and sized heavy density material readily forms clumps, these clumps tend to degrade over time. Accordingly, in the preferred embodiment the integrity of the clump is maintained by adding particles 18 of guar gum. In the preferred embodiment, the clumping agent 18 is guar gum. Guar gum is added to be in the range of 3 to 7% by weight of the total weight of the heavy and light weight particles 12, 14 and preferably about 5% by weight. The particle size distribution and viscosity of the guar gum is critical to achieve good clumping. In the preferred embodiment, 95% of the guar gum particles are smaller than 200 mesh (U.S. Standard). The viscosity of the guar gum should be more than 4500 cps in a 1% aqueous solution after 24 hours. Although the guar gum can be in the range of 3% to 7% of the total weight, lesser amounts of clumping agent 18 result in crumbly or less manageable clumps for disposal and greater amounts of clumping agent result in excessive firmness of the clumps.

Advantageously, an odor control agent, fungicide, lime, sodium bicarbonate, or materials identified in U.S. Pat. No. 5,195,465, to prolong the life of cellulosic-based litters may be added at 0 to 1% of weight of the mixture. Additionally, an odor control material and fragrance as well as a bactericide such as Myacide S2 produced by Angus Chemical, may be added.

Method of Preparation

As shown in FIG. 3, after separating the grit from the pith and chaff, the corncob grit is subjected to roller milling and hammer milling and screened to form the proper size distribution as set forth above. The light weight corncob components are formed in pellets according to a suitable method such as described in U.S. Pat. No. 5,207,389. The pellets are formed to have a density of approximately 28–35 lb/cu ft. The pellets are then reduced to the appropriate size by roller milling and hammer milling techniques and screened to obtain the light density particles 14. A predetermined amount of at least 30% by weight of the heavy weight particles 14 and the remainder to be light density particles are placed in a low shear, fluidizing mixer. The mixer should impart no shear or heat to the mixture. The mixer is run sufficiently long, such as 15–20 seconds, to provide a homogenous mixture. The oil is added to fully coat the particles. The oil is added to the mixer in an amount from 0% to 6%, preferably 4%, of the weight of the mixture of particles. It has been found that the oil facilitates the adherence of the guar gum as well as reducing dust. The next step is adding the guar gum to the mixture and thoroughly blending the mixture. During the mixing process, the guar gum adheres to the cob particles 12, 14. It has been found that the uniform covering of the oil on the corncob particles facilitates the adherence of the guar gum to the cob particles 12, 14. The odor control material with fragrance is then added at a rate of 2 to 3 lb/ton of cob components and thoroughly blended. Additionally, at this time fungicide, bactericides or other odor control materials may be added. The litter 10 is then thoroughly blended and is ready for packaging in bags, jugs, boxes, etc.

The litter thus produced is biodegradable and compostable and made from a renewable resource which is free of carcinogens. The litter is half the weight for a given volume of conventional clay litter which makes handling of the litter easier. The litter has better sorption than clay materials and excellent clumping characteristics, making it easy to remove the urine from the litter pan. The litter is essentially free of dust and has excellent odor control properties. The blend produces a litter with a minimal amount of tracking compared with previous litters.

Finally, the color of the litter is aesthetically appealing. The color is controlled by the combination of light color of the heavy portion of the cob and the darker color of the light density components of the cob.

Having described my invention, many different embodiments will become apparent to one skilled in the art to which the invention pertains without deviating from the scope of the disclosure as set forth in the appended claims.

We claim:

1. An animal litter comprising:
   a mixture of a plurality of biomass heavy density particles and a plurality of biomass light density particles, at least 70% of said light density particles being pelletized corncob chaff and pith and having a screen size to pass through 10 mesh, said mixture being between 30 to 70% by weight of said heavy density particles and a remainder of said mixture being said plurality of light density particles.

2. The animal litter of claim 1, wherein at least 60% by weight of said heavy density particles are sized between 10 mesh and 20 mesh.

3. The animal litter of claim 1, wherein said heavy density particles have a density generally in the range of 27 to 33 lb/cu ft.

4. The animal litter of claim 1, wherein light density particles have a density generally in the range of 20 to 26 lb/cu ft.

5. The animal litter of claim 1, wherein at least 60% of light density particles are sized between 14 mesh and 40 mesh.

6. The animal litter of claim 1, wherein said heavy density particles comprise generally 60% of said mixture by weight.

7. The animal litter of claim 1, wherein each of said plurality of heavy density particles and each of said plurality of light density particles have a coating of oil.

8. The animal litter of claim 7, wherein particles of guar gum are adhered to each of said pluralities of heavy density and light density particles.

9. The animal litter of claim 8, wherein at least 90% of said particles of guar gum have a screen size less than 20 mesh.

10. An animal litter comprising:
    a plurality of corncob particles, each of said plurality of particles having an outer surface having a coating of mineral oil and guar gum.

11. The animal litter of claim 10, wherein said plurality of corncob particles is comprised of a plurality of heavy density particles and a plurality of light density particles, said light density particles being formed from chaff and pith.

12. The animal litter of claim 10, wherein at least 80% of said plurality of particles have a size between 10 mesh and 40 mesh.

13. The animal litter of claim 10, wherein said guar gum is in the range of 3% to 7% of the total weight of said litter.

14. The animal litter of claim 10, wherein said oil coating is 0% to 6% by weight of the total weight of the animal litter.

15. A method of producing animal litter comprising the steps of:
    reducing corncob grit to heavy density particles;
    forming pellets of light weight natural materials and reducing said pellets to a predetermined size;
    forming a mixture which is at least 30% by weight of heavy density particles and the remainder of said light density particles;
    adding coating oil to said mixture to coat said particles and said sized pellets;
    mixing a clumping agent to said mixture after said step of adding oil.

16. The method of claim 15 further comprising the step of screening at least 60% of said light density particles to have a size between 14 mesh and 40 mesh.

17. An animal litter comprising:
    a mixture of a plurality of biomass heavy density particles and a plurality of biomass light density particles, at least 70% of said heavy density particles being corncob grit, at least 70% of said light density particles being pelletized corncob chaff and pith, said mixture being between 30 to 70% by weight of said heavy density particles and a remainder of said mixture being said plurality of light density particles, at least 87% of said mixture being sized between 10 and 40 mesh.

18. The animal litter of claim 17, wherein light density particles have a density generally in the range of 20 to 26 lb/cu ft.

19. The animal litter of claim 17, wherein each of said plurality of heavy density particles and each of said plurality of fight density particles have a coating of oil.

20. An animal litter comprising:
    a mixture of a plurality of biomass heavy density particles and a plurality of biomass light density particles, at least 70% of said light density particles being pelletized corncob chaff and pith, said mixture being between 30 to 70% by weight of said heavy density particles and a remainder of said mixture being said plurality of light density particles, and each of said plurality of heavy density particles and each of said plurality of light density particles having a coating of oil.

* * * * *